United States Patent
Bhandarkar

(10) Patent No.: US 12,413,104 B1
(45) Date of Patent: Sep. 9, 2025

(54) POWER LOSS ACCOUNTING METHOD FOR IN-POWER FOREIGN OBJECT DETECTION

(71) Applicant: Microchip Technology Incorporated, Chandler, AZ (US)

(72) Inventor: Santosh Bhandarkar, Chandler, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 18/799,456

(22) Filed: Aug. 9, 2024

Related U.S. Application Data

(60) Provisional application No. 63/642,823, filed on May 5, 2024.

(51) Int. Cl.
*H02J 50/60* (2016.01)
*H02J 50/10* (2016.01)

(52) U.S. Cl.
CPC .............. *H02J 50/60* (2016.02); *H02J 50/10* (2016.02)

(58) Field of Classification Search
CPC .................................. H02J 50/60; H02J 50/10
See application file for complete search history.

(56) References Cited

U.S. PATENT DOCUMENTS

| | | | | |
|---|---|---|---|---|
| 11,038,382 B2 * | 6/2021 | Park | .................... | H02J 50/12 |
| 11,715,981 B2 * | 8/2023 | Park | .................... | H02J 7/02 |
| | | | | 307/104 |
| 11,811,245 B2 * | 11/2023 | Mao | .................... | H02J 50/80 |
| 11,824,376 B1 * | 11/2023 | Holis | .................... | H02J 50/60 |
| 2010/0244583 A1 * | 9/2010 | Shimokawa | .......... | H04B 5/79 |
| | | | | 307/104 |
| 2013/0181724 A1 * | 7/2013 | Teggatz | .................... | H02J 50/90 |
| | | | | 374/45 |
| 2016/0006484 A1 * | 1/2016 | Swaans | .................... | H02J 50/80 |
| | | | | 307/104 |
| 2019/0123581 A1 * | 4/2019 | Wang | .................... | H02J 50/10 |
| 2020/0169123 A1 * | 5/2020 | Mehas | .................... | H02J 50/60 |
| 2020/0169124 A1 * | 5/2020 | Mehas | .................... | H02J 50/12 |
| 2020/0200937 A1 * | 6/2020 | Widmer | ................ | G01V 3/104 |
| 2020/0303940 A1 * | 9/2020 | Harris | .................... | H02J 50/50 |
| 2020/0412178 A1 * | 12/2020 | Teggatz | .................... | B60L 53/38 |
| 2021/0167637 A1 * | 6/2021 | Schwartz | ................ | H02J 50/12 |

(Continued)

OTHER PUBLICATIONS

International Search Report and Written Opinion, Application No. PCT/US2024/050318, 12 pages, Jan. 28, 2025.

*Primary Examiner* — Rexford N Barnie
*Assistant Examiner* — Michael J Warmflash
(74) *Attorney, Agent, or Firm* — SLAYDEN GRUBERT BEARD PLLC

(57) ABSTRACT

A foreign object may be detected by measuring inductance and resistance of a transmitter coil using a meter circuit when a plurality of currents are applied to the transmitter coil when the transmitter coil is in standalone conditions and when a receiver coil is mated to the transmitter coil without a foreign object present. A simulation model is generated based on the measured inductance and resistance of the transmitter coil and receiver coil and comprising a characteristic curve as a function of the plurality of currents applied to the transmitter coil. With the receiver coil mated to the transmitter coil, a foreign object may be detected by measuring a power loss from the transmitter coil to the receiver coil based on the simulation model.

20 Claims, 14 Drawing Sheets

(56) References Cited

U.S. PATENT DOCUMENTS

| | | | |
|---|---|---|---|
| 2022/0115896 A1* | 4/2022 | Cook | H02J 7/04 |
| 2022/0416588 A1* | 12/2022 | Mao | H02J 50/80 |
| 2023/0208211 A1* | 6/2023 | Jayathurathnage | H02J 50/90 |
| | | | 307/104 |
| 2023/0369901 A1* | 11/2023 | Dumais | G01R 19/2509 |

* cited by examiner

POWER LOSS ACCOUNTING METHOD FOR IN-POWER FOREIGN OBJECT DETECTION

RELATED PATENT APPLICATION

This application claims priority to commonly owned U.S. Provisional Patent Application No. 63/642,823 filed May 5, 2024, the entire contents of which are hereby incorporated by reference for all purposes.

TECHNICAL FIELD

The present disclosure relates to foreign object power loss detection in wireless power transfer systems.

BACKGROUND

Wireless power transfer techniques are widely used to transfer power from one system to another in a wide range of applications. Qi is the most widely adopted wireless charging standard and it has proliferated into nearly all consumer cell phone brands.

A Qi wireless system has a transmitter and a receiver. The transmitter controls the power transferred to the receiver based on the feedback received from the receiver. The transmitter contains at least one coil with which the receiver coil is coupled in a typical wireless system. The newer class if transmitters and receivers contain magnets which hold them together, which contrasts with the single coil transmitters of earlier days where the receiver coil may have been properly aligned with the transmitter coil for power transfer.

One of the functions of the transmitter is to detect the presence of a foreign object (FO) in its vicinity. The Qi specification recommends using two methods for Foreign Object detection (FOD) namely Q and power loss. The Qi power loss method uses a difference between the power transmitted by the transmitter and the power received by the receiver to compute the power loss. When a foreign object is present between the transmitter and receiver, the power loss numbers are higher than without the FO. The power loss difference is thus used to detect the FO.

The Qi power loss method recommends using current through the coil for estimating the losses in the transmitter. There are several losses in the transmitter from the point where the power loss is measured. The H-bridge MOSFETs, the filter components, the coil change switches, and finally the coils themselves have resistance which causes losses in these components. Further, the power loss numbers depend on several factors such as Tx-Rx coupling ratio, Tx, Rx inductance, components used in Tx, power measurement accuracy in Tx and Rx. FO detection is extremely important for wireless power systems as it has the potential to overheat the FO thereby leading to catastrophic failures and hazards.

The earlier version of the transmitters and receivers did not use magnets as it would interfere in the magnetic field produced by the transmitter. The newer receivers, especially by Apple, have magnets for firm coupling of the Tx and Rx. This has given rise to a new class of transmitters and receivers and are covered under Magnetic Power Profile (MPP) of newer version 2.0 specifications (WPC Qi 2.0). These new Tx and Rx have magnets along with the coil and snap fit when the receiver is brought closer to the transmitter. However, the presence of magnets has complicated the power loss method that was used for non-magnet solutions. The magnets add additional friendly metal (FM) losses in the system which may be accounted for to get an accurate FO detection. The MPP v2.0 specifications (WPC Qi 2.0) have described one method of determining the losses. However, this method may have an additional test jig made up of coils, capacitors, and connectors. Additionally, an accurate sinewave power source capable of supplying 15 W of power at 360 kHz along with complex current and phase measurement circuitry may be used to measure the FM loss that occurs after mating the Tx with Rx. This leads to an expensive RF based test setup to determine the losses. Further, the method described in specification may use reference Transmitter and Receiver test systems to derive the numbers, which is beyond the reach of most system designers.

Qi specification v2.0 MPP (WPC Qi 2.0) specifies a method proposed by Apple for measurement of the power loss at different points in the system. The method uses an additional jig to measure the coil parameters with an LCR meter. An LCR meter is a type of electronic test equipment used to measure the inductance (L), capacitance (C), and resistance (R) of an electronic component. In addition, a precision 360 kHz sinewave generator is used capable of supplying at least 15 W power to power the coils and measure the actual power lost in the coils at different loads. This equipment is not common in most labs working with wireless power and makes for an additional investment for carrying out the experiments.

There is a need for a method for measurement of foreign object power loss detection at different points in a power transmitter system.

SUMMARY OF THE INVENTION

Aspects provide a method to provide an accurate foreign object power loss detection with commonly available test equipment.

According to an aspect, there is provided a method comprising: providing a transmitter coil; measuring inductance and resistance of the transmitter coil in standalone conditions using a meter circuit when a plurality of currents are applied to the transmitter coil; providing a receiver coil mated to the transmitter coil without a foreign object present; measuring inductance and resistance of the transmitter coil and receiver coil in mated conditions using a meter circuit when the plurality of currents are applied to the transmitter coil; generating a simulation model based on measured inductance and resistance of the transmitter coil and receiver coil and comprising a characteristic curve as a function of the plurality of currents applied to the transmitter coil; providing a receiver coil mated to the transmitter coil with a foreign object present; and detecting the foreign object by detecting a power loss from the transmitter coil to the receiver coil based on the simulation model.

An aspect provides a method as in the previous paragraph, wherein measuring inductance and resistance of the transmitter coil and receiver coil in mated conditions using a meter circuit when the plurality of currents are applied to the transmitter coil comprises measuring inductance and resistance on the transmitter side of the mated coils.

An aspect provides a method as in one of the previous two paragraphs, wherein measuring inductance and resistance of the transmitter coil and receiver coil in mated conditions using a meter circuit when the plurality of currents are applied to the transmitter coil comprises measuring inductance and resistance on the receiver side of the mated coils.

An aspect provides a method as in one of the previous three paragraphs, wherein measuring inductance and resistance of the transmitter coil and receiver coil in mated conditions using a meter circuit when the plurality of currents are applied to the transmitter coil comprises measuring inductance and resistance with terminals of the transmitter coil short circuited with the terminals of the receiver coil so the coils are in series in a forward direction.

An aspect provides a method as in one of the previous four paragraphs, wherein measuring inductance and resistance of the transmitter coil and receiver coil in mated conditions using a meter circuit when the plurality of currents are applied to the transmitter coil comprises measuring inductance and resistance with terminals of the transmitter coil short circuited with alternate terminals of the receiver coil so the coils are in series in a reverse direction.

An aspect provides a method as in one of the previous five paragraphs, wherein the simulation model comprises: a voltage source; a transmitter coil circuit comprising a transmitter capacitor in series with a transmitter resistor in series with a transmitter inductor; a receiver coil circuit comprising a receiver capacitor in series with a receiver resistor in series with a receiver inductor; a middle circuit comprising a middle resistor and a middle inductor; and an output circuit comprising an output capacitor in parallel with an output load resistor; wherein the voltage source is in series with the transmitter coil circuit and a combination of the middle circuit, the receiver coil circuit, and the output circuit, and wherein the middle circuit is in parallel with a combination of the receiver coil circuit and the output circuit.

An aspect provides a method as in the previous paragraph, wherein measuring inductance and resistance of the transmitter coil and receiver coil in mated conditions using a meter circuit when the plurality of currents are applied to the transmitter coil comprises measuring inductance (Ltr2) and resistance (Rtr2) on the transmitter side of the mated coils; wherein measuring inductance and resistance of the transmitter coil and receiver coil in mated conditions using a LCR meter when the plurality of currents are applied to the transmitter coil comprises measuring inductance (Ltr3) and resistance (Rtr3) on the receiver side of the mated coils; wherein measuring inductance and resistance of the transmitter coil and receiver coil in mated conditions using a meter circuit when the plurality of currents are applied to the transmitter coil comprises measuring inductance (Ltr4) and resistance (Rtr4) with terminals of the transmitter coil short circuited with the terminals of the receiver coil so the coils are in series in a forward direction; wherein measuring inductance and resistance of the transmitter coil and receiver coil in mated conditions using a meter circuit when the plurality of currents are applied to the transmitter coil comprises measuring inductance (Ltr5) and resistance (Rtr5) with terminals of the transmitter coil short circuited with alternate terminals of the receiver coil so the coils are in series in a reverse direction; comprising assigning values to features of the simulation model derived from the measured inductance and resistance as follows:

inductance of the middle inductor $$(Lm) = \left| \frac{(Ltr4 - Ltr5)}{4} \right|;$$

resistance of the middle resistor $$(Rm) = \left| \frac{(Rtr4 - Rtr5)}{4} \right|;$$

inductance of the transmit inductor=Ltr2−Lm;
resistance of the transmit resistor=Rtr2−Rm;
inductance of the receive inductor=Ltr3−Lm; and resistance of the receive resistor=Rtr3−Rm.

An aspect provides a method as in the previous paragraph, comprising: assigning a resistance value to the output load resistor corresponding to a load powered by the receiver coil; changing the output load resistor of the output circuit based on a root mean square power level across the output circuit; measuring a current flowing through respective ones of the transmitter resistor, the receiver resistor, and the middle resistor; and computing a root mean square of respective ones of the transmitter resistor, the receiver resistor, and the middle resistor.

An aspect provides a method as in one of the previous eight paragraphs, comprising: calibrating the simulation model in view of the transmitter coil without a receiver coil, magnets, or foreign objects in a vicinity of the transmitter coil.

An aspect provides a method as in one of the previous nine paragraphs, wherein detecting a power loss from the transmitter coil to the receiver coil comprises: determining a total power consumed at a given instant; computing a power loss in the transmitter coil by feeding the coil current at a given instant into the characteristic curve of the simulation model; subtracting the power loss in the transmitter coil from the total power consumed to determine a power transmitted from the transmitter coil to the receiver coil; measuring the power received by the receiver coil; and subtracting the power transmitted from the transmitter coil to the receiver coil from the power received by the receiver coil.

An aspect provides a method as in one of the previous ten paragraphs, comprising comparing the power loss from the transmitter coil to the receiver coil to a predetermined threshold power loss value.

According to an aspect, there is provided a system comprising: a transmitter coil; a receiver coil; a meter circuit; a processor; memory storing instructions that, when executed by the processor, cause the system to: measure inductance and resistance of the transmitter coil in standalone conditions with the meter circuit when a plurality of currents are applied to the transmitter coil; measure inductance and resistance of the transmitter coil and receiver coil in mated conditions with the meter circuit when the plurality of currents are applied to the transmitter coil; generate a simulation model based on measured inductance and resistance of the transmitter coil and receiver coil and comprising a characteristic curve as a function of the plurality of currents applied to the transmitter coil; and detect a foreign object by detecting a power loss from the transmitter coil to the receiver coil based on the simulation model.

An aspect provides a system as in the previous paragraph, wherein instructions that, when executed by the processor, cause the system to measure inductance and resistance on the transmitter side of the mated coils.

An aspect provides a system as in one of the previous two paragraphs, wherein instructions that, when executed by the processor, cause the system to measure inductance and resistance on the receiver side of the mated coils.

An aspect provides a system as in one of the previous three paragraphs, wherein instructions that, when executed by the processor, cause the system to measure inductance and resistance with terminals of the transmitter coil short circuited with the terminals of the receiver coil so the coils are in series in a forward direction.

An aspect provides a system as in one of the previous four paragraphs, wherein instructions that, when executed by the processor, cause the system to measure inductance and resistance with terminals of the transmitter coil short circuited with alternate terminals of the receiver coil so the coils are in series in a reverse direction.

An aspect provides a system as in one of the previous five paragraphs, wherein the simulation model comprises: a voltage source; a transmitter coil circuit comprising a transmitter capacitor in series with a transmitter resistor in series with a transmitter inductor; a receiver coil circuit comprising a receiver capacitor in series with a receiver resistor in series with a receiver inductor; a middle circuit comprising a middle resistor and a middle inductor; and an output circuit comprising an output capacitor in parallel with an output load resistor; wherein the voltage source is in series with the transmitter coil circuit and a combination of the middle circuit, the receiver coil circuit, and the output circuit, and wherein the middle circuit is in parallel with a combination of the receiver coil circuit and the output circuit.

An aspect provides a system as in the previous paragraph, wherein instructions that, when executed by the processor, cause the system to measure inductance (Ltr2) and resistance (Rtr2) on the transmitter side of the mated coils; wherein instructions that, when executed by the processor, cause the system to measure inductance (Ltr3) and resistance (Rtr3) on the receiver side of the mated coils; wherein instructions that, when executed by the processor, cause the system to measure inductance (Ltr4) and resistance (Rtr4) with terminals of the transmitter coil short circuited with the terminals of the receiver coil so the coils are in series in a forward direction; wherein instructions that, when executed by the processor, cause the system to measure inductance (Ltr5) and resistance (Rtr5) with terminals of the transmitter coil short circuited with alternate terminals of the receiver coil so the coils are in series in a reverse direction; wherein instructions that, when executed by the processor, cause the system to assign values to features of the simulation model derived from the measured inductance and resistance as follows:

inductance of the middle inductor $$(Lm) = \left| \frac{(Ltr4 - Ltr5)}{4} \right|;$$

resistance of the middle resistor $$(Rm) = \left| \frac{(Rtr4 - Rtr5)}{4} \right|;$$

inductance of the transmit inductor=Ltr2−Lm;
resistance of the transmit resistor=Rtr2−Rm;
inductance of the receive inductor=Ltr3−Lm; and resistance of the receive resistor=Rtr3−Rm.

An aspect provides a system as in one of the previous seven paragraphs, comprising: wherein instructions that, when executed by the processor, cause the system to assign a resistance value to the output load resistor corresponding to a load powered by the receiver coil; wherein instructions that, when executed by the processor, cause the system to change the output load resistor of the output circuit based on a root mean square power level across the output circuit; wherein instructions that, when executed by the processor, cause the system to measure a current flowing through respective ones of the transmitter resistor, the receiver resistor, and the middle resistor; and wherein instructions that, when executed by the processor, cause the system to compute a root mean square of respective ones of the transmitter resistor, the receiver resistor, and the middle resistor.

An aspect provides a system as in one of the previous seven paragraphs, wherein instructions that, when executed by the processor, cause the system to: determine a total power consumed at a given instant; compute a power loss in the transmitter coil by feeding the coil current at a given instant into the characteristic curve of the simulation model; subtract the power loss in the transmitter coil from the total power consumed to determine a power transmitted from the transmitter coil to the receiver coil; measure the power received by the receiver coil; and subtract the power transmitted from the transmitter coil to the receiver coil from the power received by the receiver coil.

BRIEF DESCRIPTION OF THE DRAWINGS

The figures illustrate examples of a method of using the inductance-resistance (LR) measurements taken on the transmitter and receiver coils in standalone and mated conditions using a precision LCR meter. The power loss estimation is done in three phases—modelling, calibration, and operating.

The reference number for any illustrated element that appears in multiple different figures has the same meaning across the multiple figures, and the mention or discussion herein of any illustrated element in the context of any particular figure also applies to each other figure, if any, in which that same illustrated element is shown.

DESCRIPTION

According to an aspect, there is provided a method of using the inductance-resistance (LR) measurements taken on the transmitter and receiver coils in standalone and mated conditions using a precision LCR meter. The power loss estimation is done in three phases—modelling, calibration, and operating.

Figure 1:
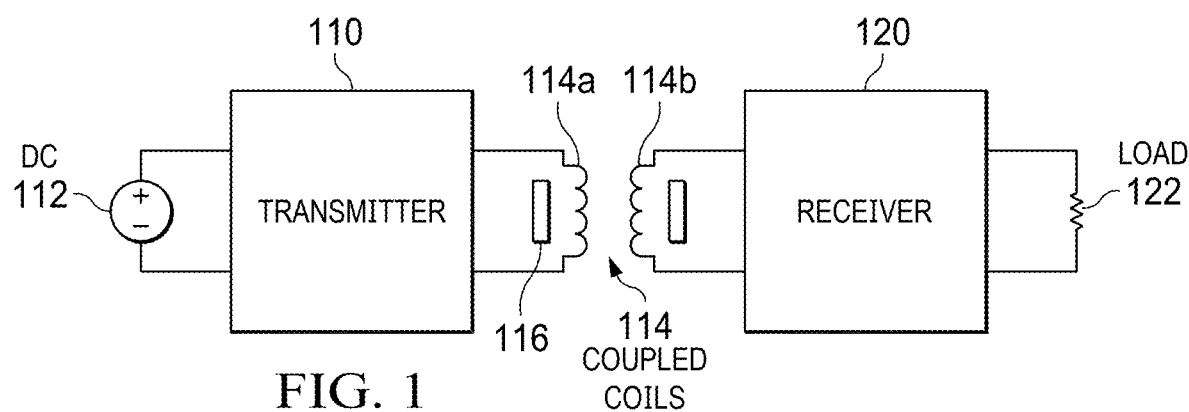
FIG. 1 shows a block diagram of the wireless power system.

FIG. 1 shows a block diagram of the wireless power system. It has a transmitter 110 and a receiver 120. The transmitter 110 is powered by a dc voltage source 112, while the receiver 120 is connected to the load 122. The power is transferred from transmitter to receiver through a set of coupled coils 114 with magnets 116, having a transmitter coil 114a and a receiver coil 114b. The power transmission is efficient when the coils 114 are placed one over the other and are aligned. There is no physical connection between the transmitter 110 and the receiver 120, and the power is transferred by magnetic flux linkage. The transmitter 110 controls the power transferred by controlling the input voltage, frequency, phase or duty cycle of the signal applied to the coil. The transmitter coil 114a has a circular/rectangular coil wound on a ferrite base. An additional magnet 116 is placed around the coil 114a in the newer magnetic power profile (MPP) based designs.

Figure 2:
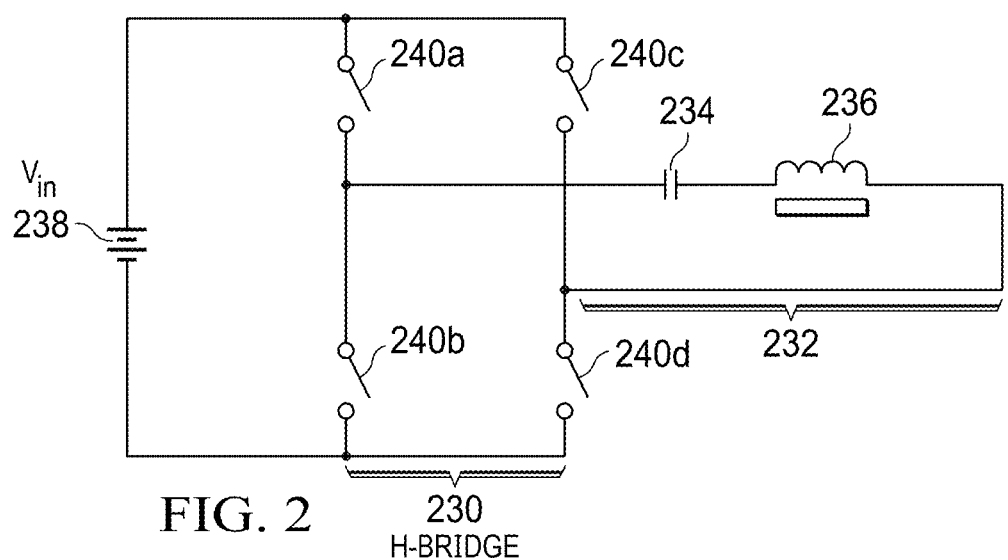
FIG. 2 shows the block diagram of the transmitter and the receiver hardware.

FIG. 2 shows the block diagram of the transmitter and the receiver hardware. The transmitter has an MOSFET H-bridge 230, which is controlled by a microcontroller chip. The resonant tank 232 formed by capacitor 234 and the coil 236 are connected across an output of the H-bridge 230. The input to the H-bridge 230 comes directly from the source 238 or from the output of the four-switch buck boost converter (FSBBC), which controls the input voltage to the H-bridge 230. The H-bridge 230 has four switches 240a-240d, as shown in FIG. 2. The switches 240a-240d may be MOSFETs driven by a MOSFET driver. The MOSFET driver inputs may be controlled by PWM pins on a microcontroller chip. In the positive half cycle, switches 240a and 240d are turned ON, while 240b and 240c are turned ON in the other half cycle. The frequency of operation may be fixed at 128 kHz for the selected topology at start and changes to 360 kHz if a magnetic power profile (MPP) receiver with magnet is detected. The H-bridge 230 applies an AC voltage across the resonant tank 232 formed by capacitor 234 and the coil 236.

Figure 3:
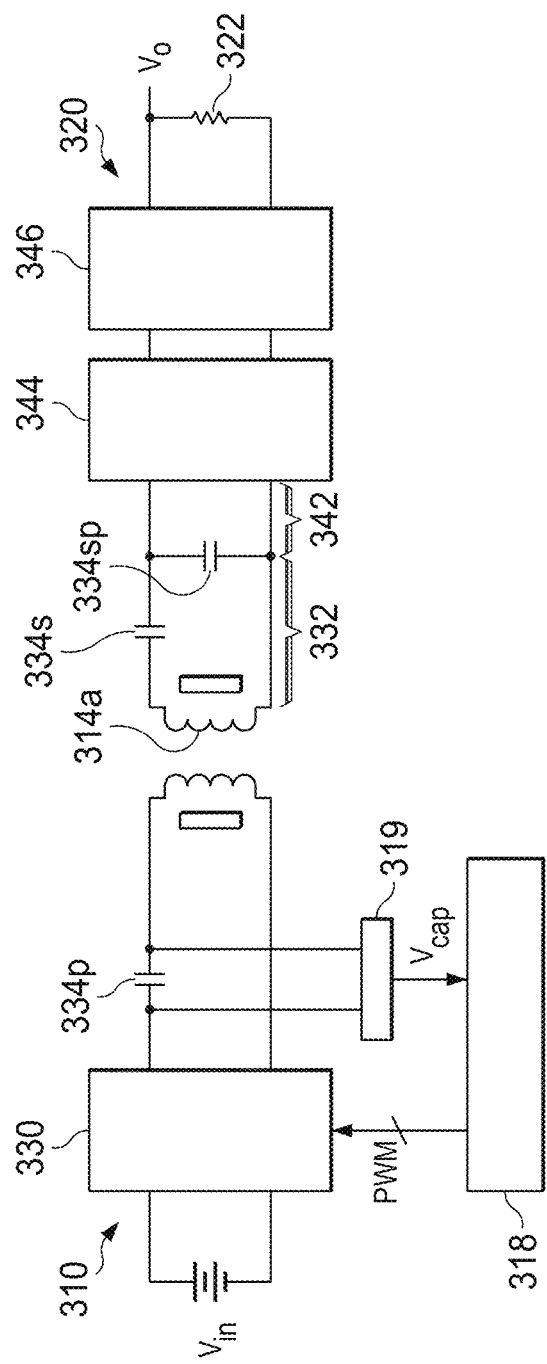
FIG. 3 shows a receiver having a resonant tank formed by a receiver coil and the capacitors Cs and Csp.

The receiver 320 has a resonant tank 332 formed by a receiver coil 314a and the capacitors 334s and 334sp, as shown in FIG. 3. The output 342 of the resonant circuit 332 is passed through a diode bridge rectifier 344 which rectifies the voltage. The output of the diode bridge rectifier 344 is passed through comm and voltage control 346, which may be either a buck converter or a low drop out (LDO), which provides a fixed voltage at the output load 322.

The processor 318 samples the voltage across the coil as shown in FIG. 3. It also drives the inverter PWM pulses with either a fixed or variable frequency depending on the topology of the transmitter. In the case of magnet-based design, the frequency is fixed and the input voltage is varied for output power control.

A gain block 319 may be an op-amp based differential amplifier with gain G. The capacitor voltage across capacitor 334p is differentially sensed and converted into digital values by an analog digital converter (ADC). The capacitor current is same as the coil current and is computed as multiple of capacitance value and the differential of the capacitor voltage using a high-speed ADC. The current samples are squared, summed and square rooted to find the root mean square (RMS) value of the coil current.

Figure 4:
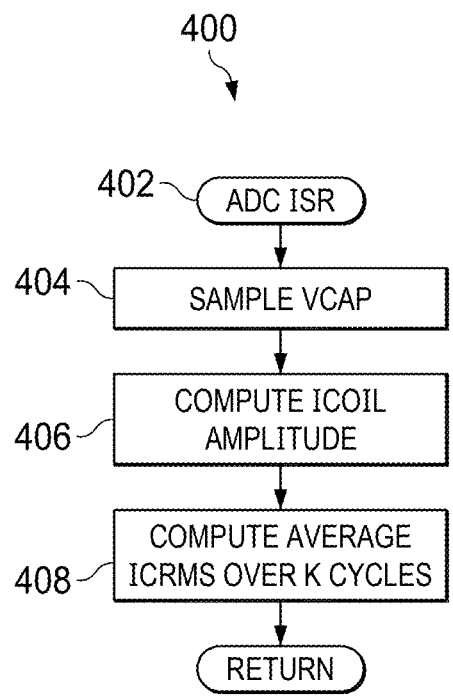
FIG. 4 shows interrupt routine to collect the Vcap samples.

FIG. 4 shows interrupt routine 400 to collect the Vcap samples. This is generally done using displaced moving average (DMA) where a fixed number of samples running into several cycles are collected. A set of data in collected via an analog to digital converter (ADC) interrupt service routine (ISR) 402. At the end of analog digital converter (ADC) sampling, an average of about four hundred Vcap samples are collected 404 in the buffer. The coil current ($I_{coil}$) amplitude is computed 406 based on the C*dV/dt formula over the entire sample size. The coil current RMS is then computed 408 for the given duration, which is used for power loss measurements.

The LR measurements are next taken to complete the power loss model. This is done once for each transmitter design based on the transmitter coil used. The receiver coil may match the specifications provided for the TPR #MPP1coil in the specification (Magnetic Power Profile (MPP) of newer version 2.0 specifications (WPC Qi 2.0)). In most cases, the test equipment manufacturer provides the reference coil as part of the test setup. There are five readings taken with LCR meter for the Ls, Rs measurements at frequency of interest e.g. 128 kHz, 360 kHz. Prior to taking the measurements, the LCR meter is calibrated with open circuit and short circuit tests to make sure that the readings are accurate. Also, the designed z-distance between the coils when they are mated may be maintained for measurements.

Figure 8:
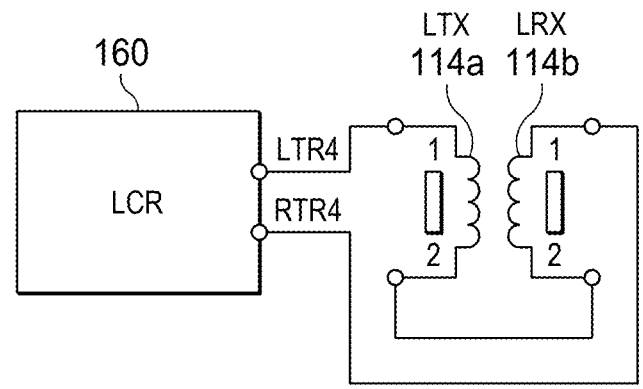
FIG. 8 shows a circuit diagram for measurement of the transmitter coil and the receiver coil mated together for LR measurement of mated coils with identical terminals (2,2) short circuited so that they are in series with the receiver in a forward direction.
Figure 9:
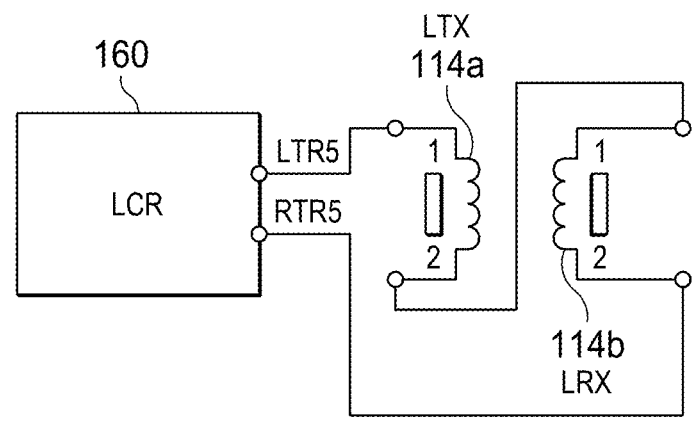
FIG. 9 shows a circuit diagram for measurement of the transmitter coil and the receiver coil mated together for LR measurement of mated coils with alternate terminals (2,1) short circuited so that they are in series with the receiver in a reverse direction.
Figure 10:
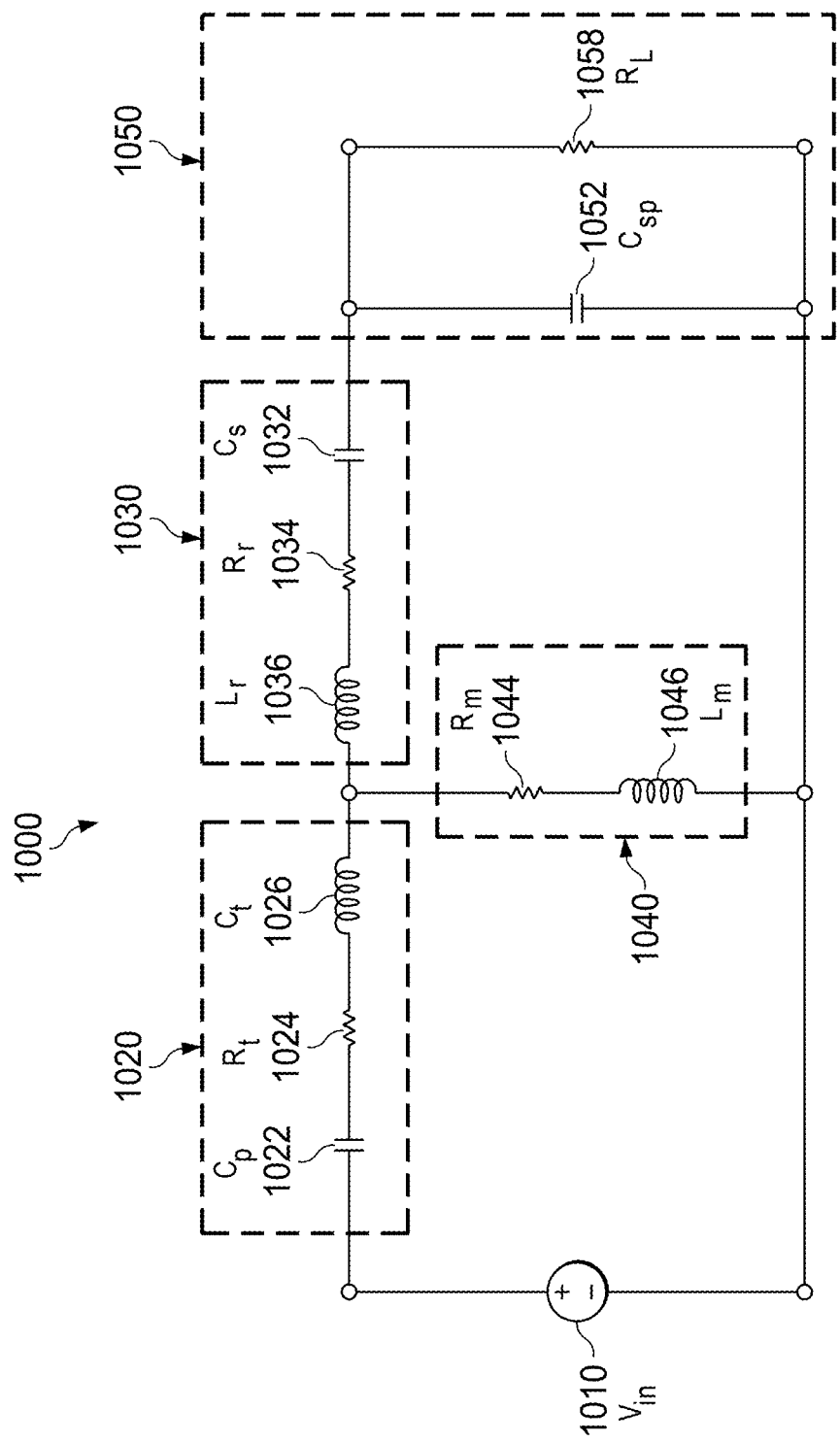
FIG. 10 shows the power loss simulation model created after all the measurements of the circuits shown in FIGS. 5-9 are taken.

FIGS. 5 through 9 show circuit diagrams for measurements used in the modelling phase, and FIG. 10 shows the power loss simulation model created after all the measurements of the circuits shown in FIGS. 5 through 9 are taken. In the modelling phase, the LR measurements are taken in standalone mode with both the transmitter and receiver coils at 128 kHz and 360 kHz. In mated mode, the LR readings are taken under different conditions. In the first condition, both the Tx and Rx coils are open, and the measurement is taken across the Tx terminals. In the second condition like the first condition, the measurement is taken across the Rx terminals. In the third condition, one Tx terminal is connected in series with the Rx terminal and the reading is taken across the open Tx and Rx terminals. The fourth condition is like the third condition with the difference being that the Rx terminals are swapped. These measurements are used to create a simulation model where the output voltage on the Rx is held at a fixed value and a graph of the coil current RMS square is plotted with the power loss observed on the transmitter Tx side of the matted coils. The slope of the curve provides an estimate of the power loss indexed to the coil current.

Figure 5:
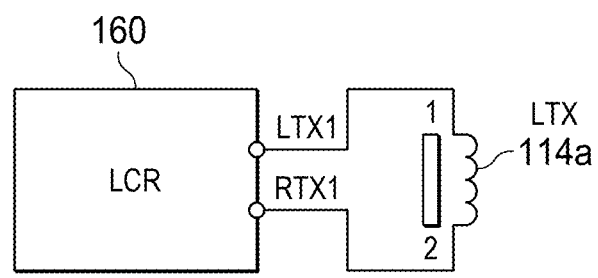
FIG. 5 shows a circuit diagram for measurement of the transmitter coil alone.

FIG. 5 shows a circuit diagram for measurement of the transmitter coil alone. The first measurement is taken by a meter circuit 160, such as an LCR meter, with the transmitter coil transmitter coil 114*a* alone and the readings taken at points 1 and 2 indicating the current flows in a direction from point 1 to point 2. The readings are marked as Ltx1 and Rtx1.

Figure 6:
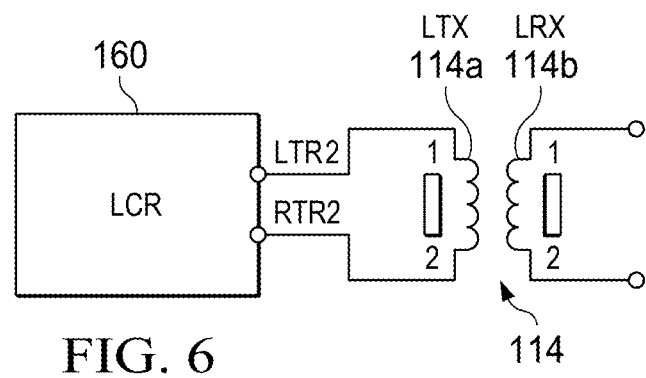
FIG. 6 shows a circuit diagram for measurement of the transmitter coil and the receiver coil mated together, wherein the measurement is taken on the transmitter side.

FIG. 6 shows a circuit diagram for measurement by a meter circuit 160 of the transmitter coil 114*a* and the receiver coil 114*b* mated together, wherein the measurement is taken on the transmitter side of the mated or coupled coils 114. The inductance Ltr2 and resistance Rtr2 are measured via a meter circuit 160, such as an LCR meter, on the transmitter side of the mated coils 114 as in FIG. 6 and named as Ltr2 and Rtr2. During this test, the receiver coil 114*b* is open. Current flows in directions from points 1 to points 2 for each coil, respectively.

Figure 7:
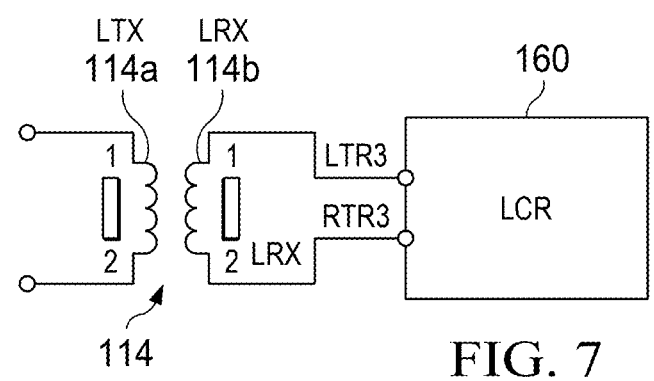
FIG. 7 shows a circuit diagram for measurement of the transmitter coil and the receiver coil mated together, wherein the measurement is taken on the receiver side.

FIG. 7 shows a circuit diagram for measurement of the transmitter coil and the receiver coil mated together, wherein the measurement is taken on the receiver side of the mated or coupled coils 114. The receiver side inductance Ltr3 and resistance Rtr3 are measured via a meter circuit 160, such as an LCR meter, as in FIG. 7. During this test, the transmitter side coil 114*a* is open. Current flows in directions from points 1 to points 2 for each coil, respectively.

FIG. 8 shows a circuit diagram for measurement of the transmitter coil and the receiver coil mated together for LR measurement of mated coils with identical terminals (2,2) short circuited so that they are in series with the receiver in a forward direction. Current flows from point 1 to point 2 across the transmitter coil 114*a* and current flows from point 2 to point 1 across the receiver coil 114*b*. FIG. 8 shows the LR measurements taken across one terminal of Tx coil and another terminal of Rx coil. In FIG. 8, the identical numbered terminals (2,2) are short circuited. The measurements via a meter circuit 160, such as an LCR meter, shown in FIG. 8 are marked as Ltr4 and Rtr4.

FIG. 9 shows a circuit diagram for measurement of the transmitter coil and the receiver coil mated together for LR measurement of mated coils with alternate terminals (2,1) short circuited so that they are in series with the receiver in a reverse direction. Current flows from point 1 to point 2 across the transmitter coil 114*a* and current flows from point 1 to point 2 across the receiver coil 114*b*. FIG. 9 shows the LR measurements taken across one terminal of Tx coil and another terminal of Rx coil. In FIG. 9, the non-identical terminals (1,2) are short circuited. The measurements via a meter circuit 160, such as an LCR meter, shown in FIG. 9 are marked as Ltr5 and Rtr5.

FIG. 10 shows the power loss simulation model created after all the measurements of the circuits shown in FIGS. 5-9 are taken. One aspect is to create the simulation model, add the values, and simulate to read the power loss numbers in the system. This can be done using a simulation tool, such as PSpice, Matlab, or Excel. The power loss simulation model 1000, shown in FIG. 10, comprises a voltage source $V_{in}$ 1010, a transmitter coil circuit 1020; a receiver coil circuit 1030, a middle circuit 1040, and an output circuit 1050. The transmitter coil circuit 1020 comprises a transmitter capacitor Cp 1022 in series with a transmitter resistor Rt 1024 in series with a transmitter inductor Lt 1026. The receiver coil circuit 1030 comprises a receiver capacitor Cs 1032 in series with a receiver resistor Rr 1034 in series with a receiver inductor Lr 1036. The middle circuit 1040 comprises a middle resistor Rm 1044 and a middle inductor Lm 1046. The output circuit 1050 comprises an output capacitor Csp 1052 in parallel with an output load resistor $R_L$ 1058. The power loss simulation model 1000, shown in FIG. 10, has the voltage source $V_{in}$ 1010 in series with the transmitter coil circuit 1020 and a combination of the middle circuit 1040, the receiver coil circuit 1030, and the output circuit 1050. The middle circuit 1040 is in parallel with a combination of the receiver coil circuit 1030 and the output circuit 1050.

The values in the power loss simulation model 1000 are derived from the measurements of the circuits shown in FIGS. 5-9 as follows:

$$Lm = \left| \frac{(Ltr4 - Ltr5)}{4} \right|$$

$$Rm = \left| \frac{(Rtr4 - Rtr5)}{4} \right|$$

$$Lt = Ltr2 - Lm$$

$$Rt = Rtr2 - Rm$$

$$Lr = Ltr3 - Lm$$

$$Rr = Rtr3 - Rm$$

The above values are calculated based on no additional x-y offset or z-distance between the coils. However the measurements can be repeated at four distinct points as specified in the model as (r,z) viz (0,0), (0,2), (2,0) and (2,2). An average model can be considered based on the average values of all the four measurements for each parameter. The capacitors used in the model may be the same value as mentioned in the Magnetic Power Profile (MPP) of newer version 2.0 specifications. These capacitors may be present in both the Tx and Rx as part of the series LC tank network.

The power loss simulation model 1000 may be based on the equivalent T-model of the coupled coils and is sourced with a voltage source $V_{in}$. The voltage waveshape is sine, but square wave input also leads to similar numbers as the output voltage is regulated at a fixed value. The output is connected to a load resistance equivalent to the load powered by the receiver. The output can be connected via a diode bridge to regulate the DC voltage at the output. However, a similar result can be obtained by maintaining the RMS power level and RMS voltage level at the output. The load is changed based on the power levels insteps of 1 W from 1 W to 15 W. At each iteration, the output voltage is maintained at a fixed output voltage e.g., 14V by varying the input voltage. For power levels below 10 W, 12V is maintained, while 14V is maintained for higher power. The current flowing through each of the resistors Rt, Rr and Rm is measured and RMS of each is computed. The power loss due to magnet-based coil coupling referred to as FM (Friendly Metal) is the sum of the RMS current squared times the resistance in both Tx and Rx coils.

FIGS. 11 through 14 show aspects of the calibration phase, where the transmitter is operated alone without any receiver on its surface. The input voltage being the control variable iteratively varies from a minimum level to a maximum level. At iterations, the input power into the inverter is measured along with the coil current RMS for each coil. The higher the value of input voltage, the higher the power lost in the transmitter. A graph of the coil current squared versus input power is plotted and a first order curve (or second order curve) is fitted. The curve coefficients are stored in memory, which provides the power loss level depending on the coil current RMS value. A first order curve (or second order curve) equation may be generated. The input power computed at iterations symbolizes the power lost in the non-ideal transmitter elements. Because Rx or FO is not present, the input power is equal to the power consumed by the resistive elements of the transmitter. However, a part of the FM loss also gets included and may be removed.

Figure 11:
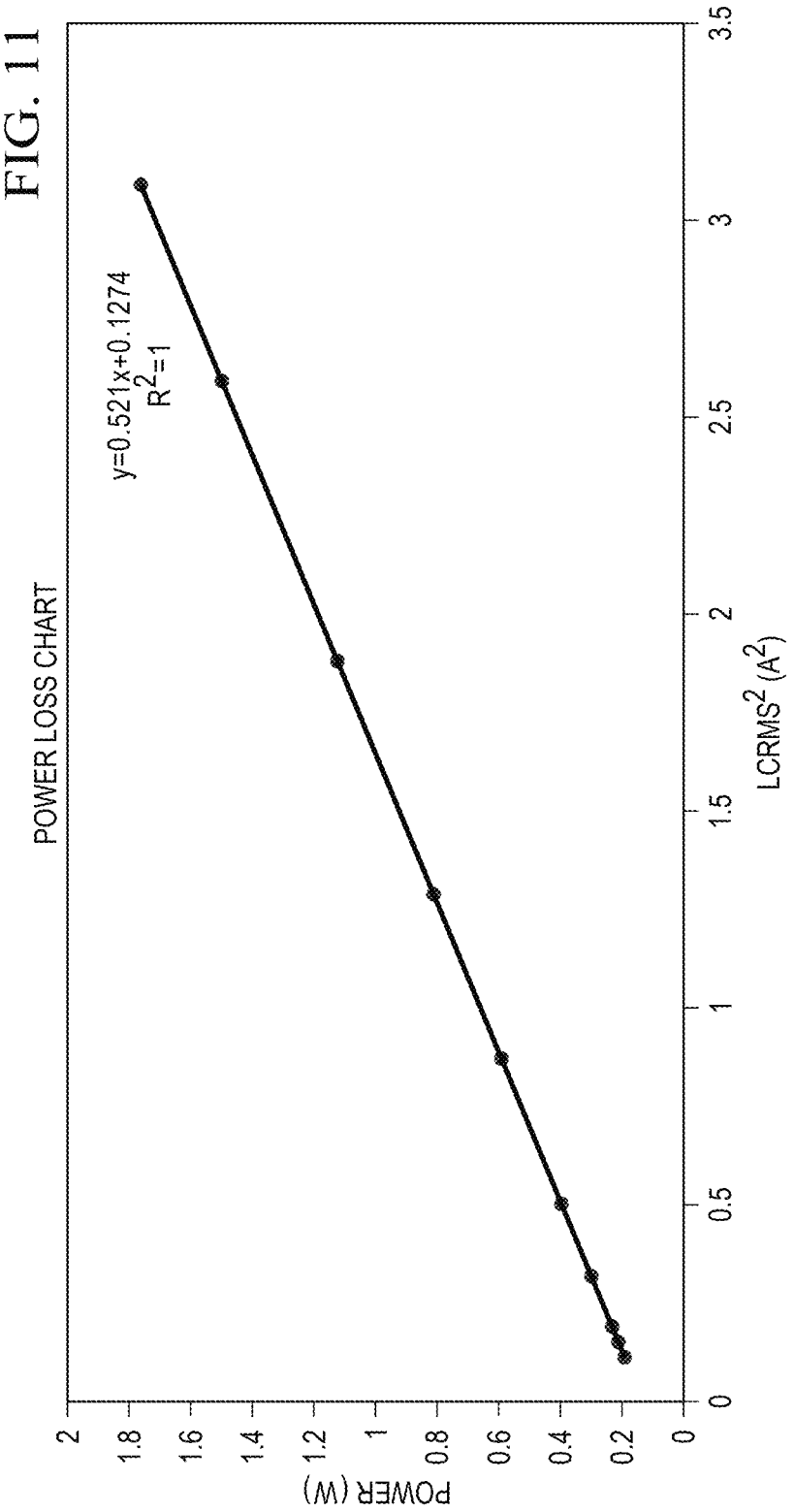
FIG. 11 shows a total FM power loss curve from simulation plotted against square of the RMS coil current.

FIG. 11 shows a total FM power loss curve from the power loss simulation model 1000 plotted against square of the RMS coil current. The FM power loss is computed for each load and plotted as a function of the coil current RMS^2 as shown in FIG. 11. The FM Ploss plot shows the active power lost in the power loss simulation model 1000 while supplying different levels of load power. The slope of the curve provides the equivalent resistance of the coupled coils.

Figure 12:
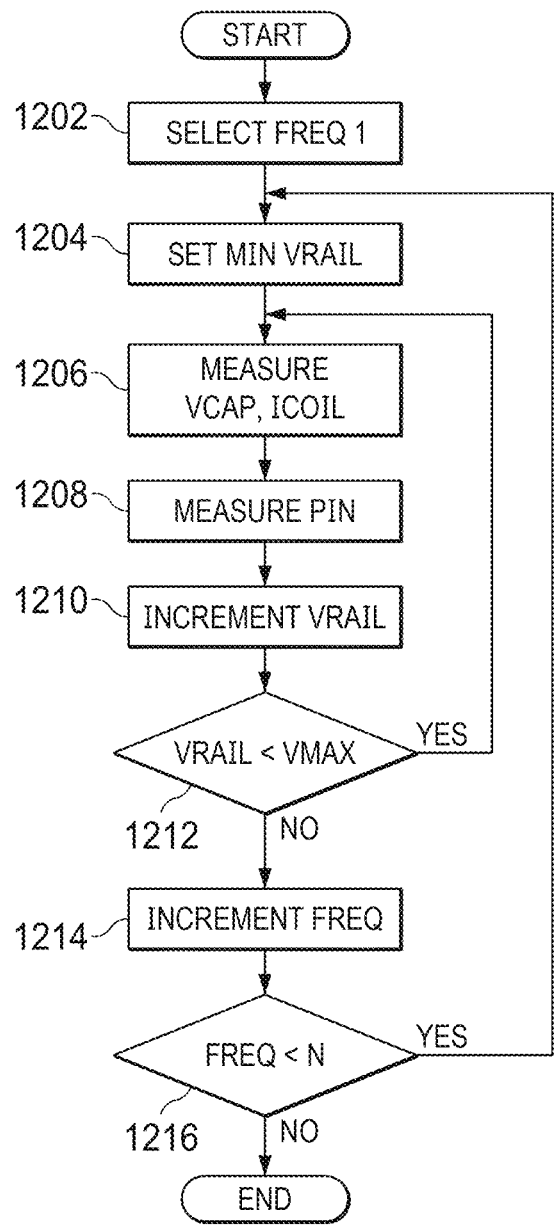
FIG. 12 shows a flow chart for the calibration power run for each transmitter after fabrication.

FIG. 12 shows a flow chart for the calibration power run for each transmitter after fabrication. The calibration is run with the transmitter coil by itself without any metal or receiver coil in the vicinity. There are multiple frequencies at which the calibration data may be taken and saved into the memory for later use. The lowest frequency is started first by selecting 1202 the first frequency. The minimum rail voltage Vrail is set 1204. The voltage sample (Vcap) and the coil current ($I_{coil}$) are measured 1206. The power in ($P_{in}$) is measured 1208. The Vrail is incremented 1210. It is then determined 1212 whether Vrail is less than Vmax. If yes, the process returns to measure 1206 the voltage sample (Vcap) and the coil current ($I_{coil}$). If no, frequency is incremented 1214. Then it is determined 1216 whether the frequency is less than a number of preselected frequencies, and if yes, the process returns to set 1204 the minimum rail voltage Vrail. The coil current RMS value is computed along with the input power to the circuit. The rail voltage Vrail varies iteratively from minimum to maximum. The typical values for the frequency are 128 kHz and 360 kHz while the rail voltage varies at 1V iterations from 1V to 19Vs. At iterative rail voltages, the coil current RMS value is computed along with the input power to the circuit.

The calibration is done once at the start of the product life. The calibrated data is used to estimate the power lost in the transmitter. FIG. 12 shows the conversion of calibrated data into a linear equation. This can be done using a microcontroller or using software program like Excel. The first order equation is of the format $$Ptl = a*Icrms^2 + b$$

where a and b are coefficients, Ptl is the power lost in the transmitter in Watts, Icrms is the coil current in A.

Figure 13:
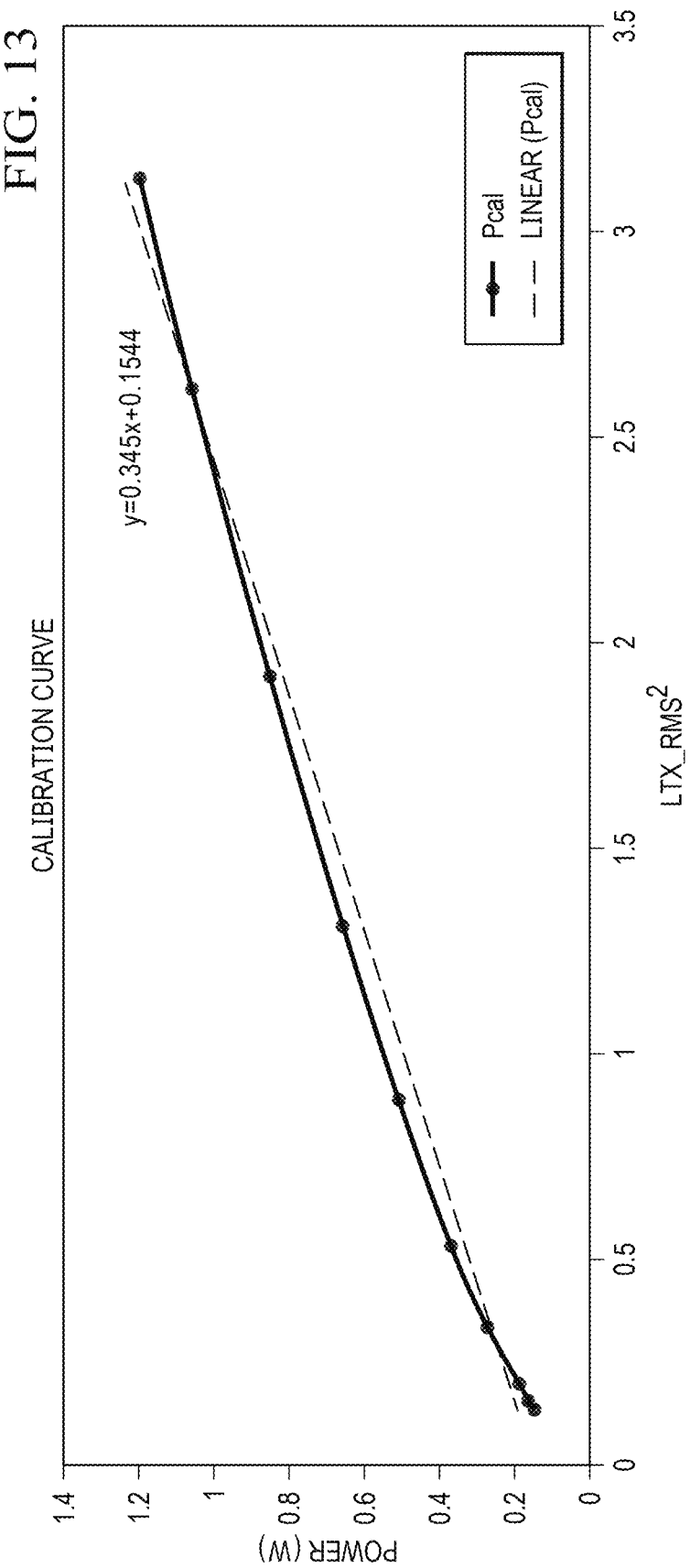
FIG. 13 shows a calibration curve indicating the power lost in the Tx.

The calibration curve shown in FIG. 13 indicates the power lost in the Tx. This shows the power lost in the circuitry such as H-bridge MOSFETs and current sense resistor. It also includes the power lost in the coil which can be split into the power lost in the bare coil without any magnetic components and the power loss due to the magnetic components. The magnetic component of the power loss will be included in the FM loss discussed later. To prevent the power loss in the Tx coil due to magnets from accounting twice, it is subtracted from the Ptl. Due to this the Pcal now is circuit loss and the bare coil loss. The bare coil resistance can be computed as $$Ptl' = Ptl - Icrms^2*(Rtx1 - Rbare)$$

where Rtx1 is the resistance of the Tx coil with magnetic elements Rbare is the resistance of the Tx coil without magnetic elements.

Figure 14:
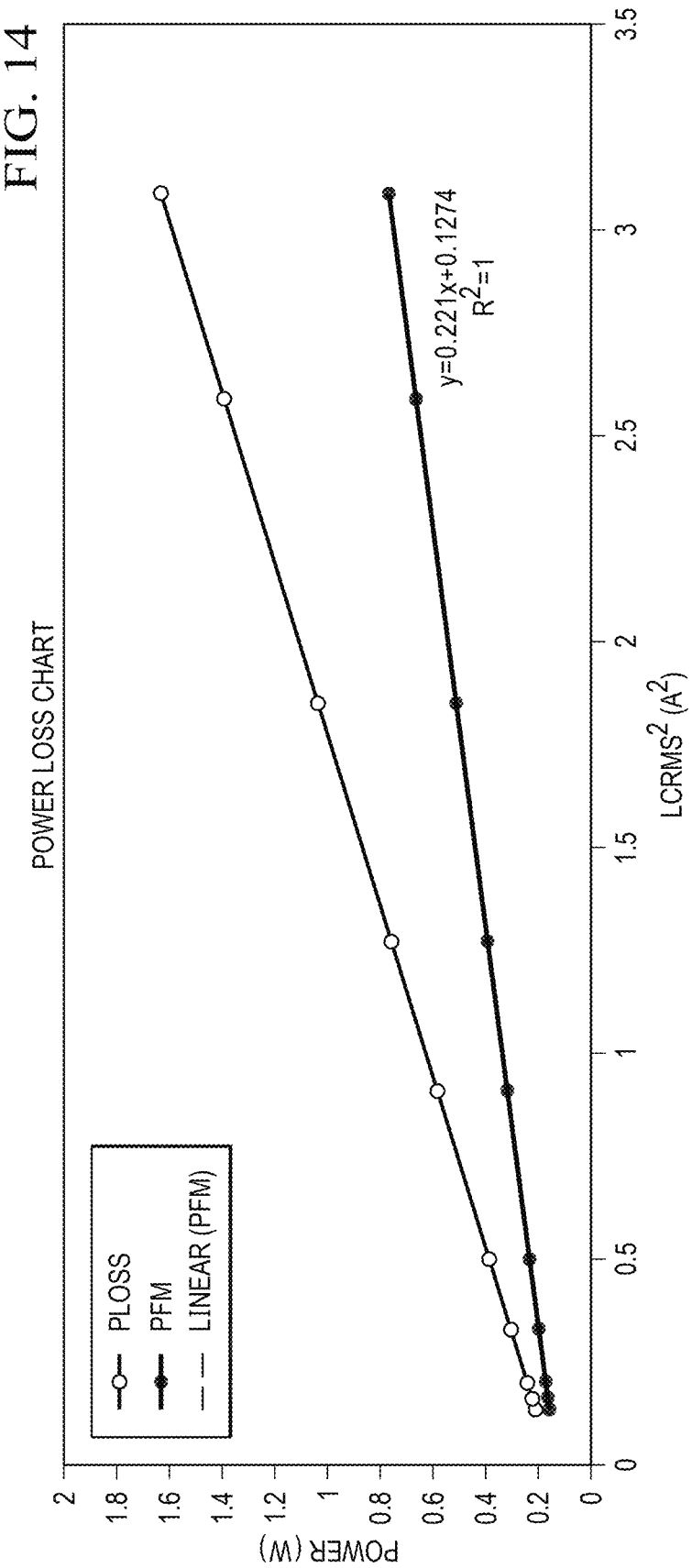
FIG. 14 shows a power loss plot of power verses the square of the coil current in A.

Alternatively, the Tx bare coil transmitter loss can be accounted from the FM Ploss as shown in FIG. 14. To prevent including the loss twice, the power lost in the transmitter coil is subtracted from the Ploss and the revised friendly metal loss due to coupling. The subtraction may be either at FM loss or calibrated loss and not both. It is easier to subtract bare loss from Ploss as the coefficients are predetermined and not dependent on individual transmitter, but on the transmitter design.

$$Pfm = Ploss - Icrms^2*Rbare$$

is plotted as shown in FIG. 14. In this condition, Ptl is used in place of Ptl'. The Pfm and Ptl curves can be combined into a single equation to reduce the computations in realtime. This can be done by adding the a and the b coefficients of the two equations. These calculations can be done once the calibration is complete. Alternately, they can be computed independently and added to get the total loss.

When the Tx is supposed to work with multiple receivers, the PFM value from the curve will be multiplied with constants $\alpha_{fm}$ and $\alpha_{fm,dc}$ sent by the receiver. The receiver derives the constant numbers by calibrating it with a standard reference transmitter coil. In this condition, the coefficients can be modified as $$a_{eff} = a_{cal} + g_{coilTx\_fm}*\alpha_{fm}*\alpha_{fm}$$

$$b_{eff} = b_{cal} + g_{coilTx\_fm\_dc}*\alpha_{fm,dc}*b_{fm}$$

and the effective power loss can be computed as $$Peff = a_{eff}*Icrms^2 + b_{eff}$$

The coefficients $g_{coilTx\_fm}$ and $g_{coilTx\_fm\_dc}$ are derived from mating the transmitter with a reference receiver TPR #MPP1 as given below. The reference receiver sends the values $\alpha_{fm\_mpp1}$ and $\alpha_{fm\_de\_mpp1}$. This is done once per design and is set as fixed coefficients in the transmitter memory.

$$g_{coilTx\_fm} = \alpha_{fm}/\alpha_{fm\_mpp1}$$

$$g_{coilTx\_fm\_dc} = \alpha_{fm\_dc}/\alpha_{fm\_dc\_mpp1}$$

Alternately, $g_{coilTx\_fm\_dc}$ can also be set to 1 as the de component is a fixed offset which can be subtracted from the threshold set for the design.

Figure 15:
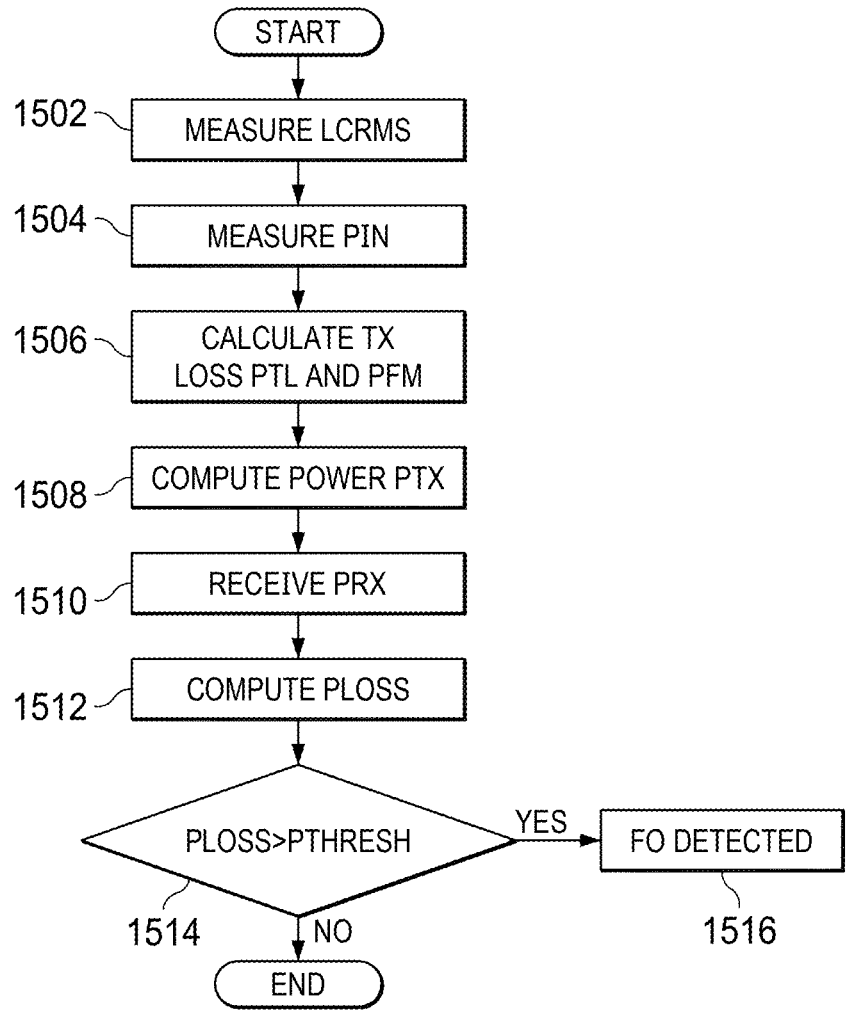
FIG. 15 shows the algorithm in the normal operating mode.
Figure 16:
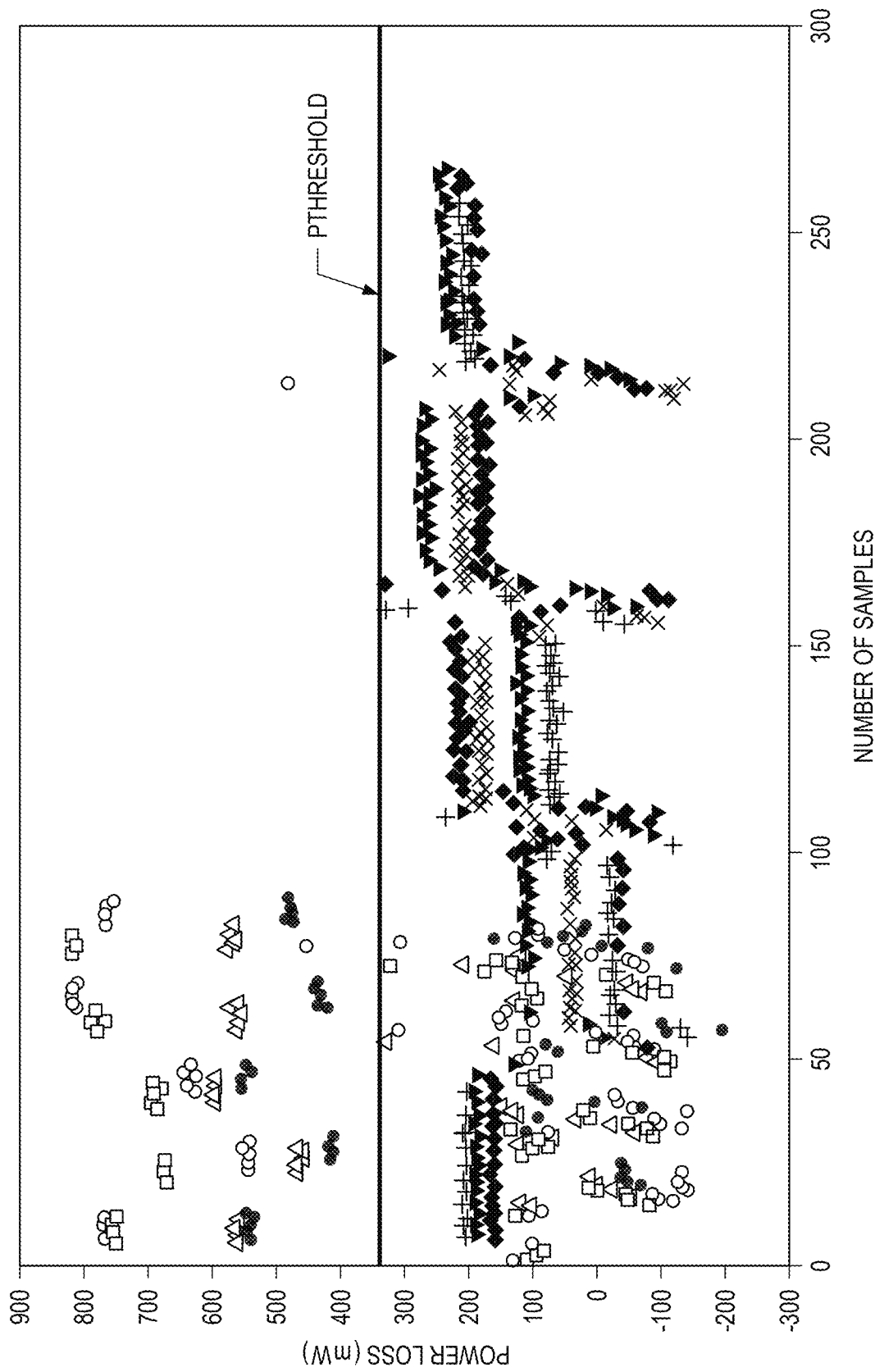
FIG. 16 shows a plot of power loss verses a number of samples relative to a threshold, wherein the power loss numbers are derived from the tests run on the transmitter.

FIGS. 15 and 16 show aspects of the operation phase. An Icrms is measured 1502. Input power to the inverter $P_{in}$ is measured 1504. A transmitter Tx power loss Ptl and Power Friendly Metal Pfm are calculated 1506. A transmitter power Ptx is computed 1508. A power received by the receiver coil $P_{Rx}$ is measured 1510. A power lox $P_{loss}$ is computed 1512. It is then determined whether the power loss $P_{loss}$ is greater than a power threshold $P_{thresh}$, and if yes, a foreign object FO is determined 1516 to have been detected.

In the operating phase shown in FIG. 15, with a receiver on the transmitter surface, input power to the inverter is computed at millisecond intervals. This value signifies the total power consumed which is the loss in the transmitter as well as the power supplied to the receiver. To retrieve the power sent to receiver, the transmitter losses are separated from total input power. The transmitter losses are computed from the characteristic curve, by feeding the coil current at that point. Once the power supplied to the receiver is determined at a given instant, the power loss can be computed by subtracting the receiver power number shared by the receiver at the same instant. The transmitter power is the DC input power subtracted by the losses from characteristic curve at coil current and the friendly metal FM power losses at that coil current. The power loss number is compared with a preset power threshold to determine if a foreign object is present. If a FO is present, the power loss number is large (exceeds a threshold), as the transmitter supplies its own loss, the receiver and the foreign object, which indicates the presence of a foreign object. This leads to a larger power loss number than if a FO was not present. Whenever a FO is detected, the transmitter stops supplying power to the receiver.

FIG. 15 shows the algorithm in the normal operating mode. The coil current is measured in at PWM cycles along with input power. The transmitter power loss is computed at a predetermined instance typically at 1 ms intervals in synchronization with the receiver. The transmitter computes the power it sent to receiver using either of the equation below depending on the computations:

$$Ptx=Pin-Ptl-Pfm$$

$$Ptx=Pin-Peff$$

The receiver sends the power it measured at its coil Prx at the same instant. The power loss is then computed as $$Ploss=Ptx-Prx$$

If Ploss>Pthres, it indicates presence of FO between the transmitter and receiver as the FO consumes power. If Ploss<Pthres, then the power transmitted is received by the receiver. The FO presence information can be used by Tx to either cut off power to Rx or renegotiate to lower power levels until the Ploss numbers are lower than Pthres.

The power loss numbers derived from the tests run on the transmitter are as shown in FIG. 16. The Tx may shut down if five consecutive Ploss numbers exceed the Pthres. The Pthres is set at appropriate levels based on the test results. The tests results below the threshold correspond to the tests run without any FO between the Tx and Rx, and with the Rx sending appropriate power loss numbers. The numbers above the threshold correspond to the tests with either the FO present or the Rx sending numbers closely resembling presence of the FO. This clearly shows the demarcation of the power loss levels with and without FO in the system and thus accurate detection of the FO presence.

The solution is derived as the transmitter power loss estimates match at different control variable points, which depend on the transmitter to receiver coupling, receiver load, receiver output voltage, and magnet type. Further, the transmitter design may work with multiple receiver designs (~165). If the power loss numbers are not accurate, there could be false trips due to absence of FO or transmitter could fail to stop power in the presence of FO. If the tests are not accurate, the product cannot pass the compliance tests and will not be certified.

Figure 17:
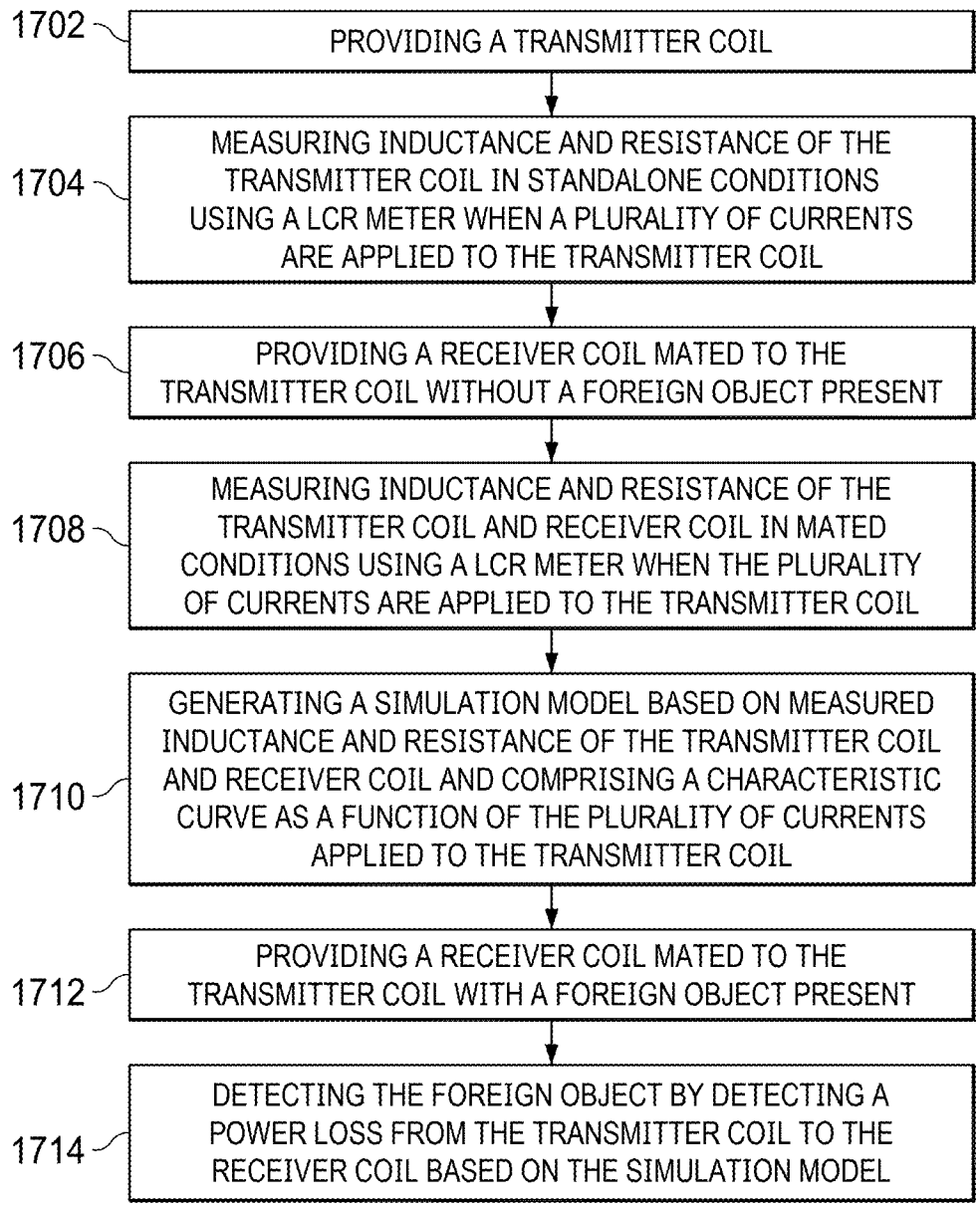
FIG. 17 shows a flow chart of a method of using the inductance-resistance (LR) measurements taken on the transmitter and receiver coils in standalone and mated conditions using a meter circuit.

FIG. 17 shows a flow chart of a method of using the inductance-resistance (LR) measurements taken on the transmitter and receiver coils in standalone and mated conditions using a precision LCR meter. A transmitter coil is provided 1702. Inductance and resistance of the transmitter coil in standalone conditions are measured 1704 using a LCR meter when a plurality of currents are applied to the transmitter coil. A receiver coil mated to the transmitter coil without a foreign object present is provided 1706. Inductance and resistance of the transmitter coil and receiver coil in mated conditions are measured 1708 using a LCR meter when the plurality of currents are applied to the transmitter coil. A simulation model is generated 1710 based on measured inductance and resistance of the transmitter coil and receiver coil and comprising a characteristic curve as a function of the plurality of currents applied to the transmitter coil. A receiver coil mated to the transmitter coil is provided 1712 with a foreign object present. The foreign object is detected 1714 by detecting a power loss from the transmitter coil to the receiver coil based on the simulation model.

Figure 18:
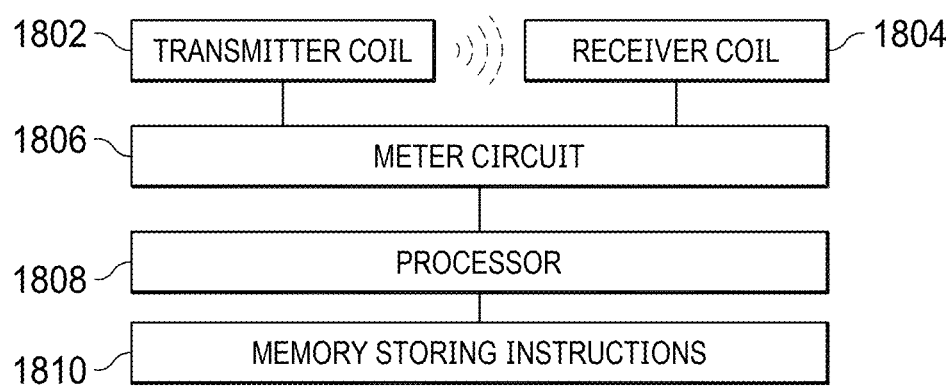
FIG. 18 shows a schematic diagram of a system comprising: a transmitter coil; a receiver coil; a meter circuit; a processor; and a memory storing instructions.

FIG. 18 shows a schematic diagram of a system comprising: a transmitter coil 1802; a receiver coil 1804; an meter circuit 1806; a processor 1808; and a memory storing instructions 1810. The instructions, when executed by the processor, cause the system to: measure inductance and resistance of the transmitter coil in standalone conditions with the meter circuit when a plurality of currents are applied to the transmitter coil; measure inductance and resistance of the transmitter coil and receiver coil in mated conditions with the meter circuit when the plurality of currents are applied to the transmitter coil; generate a simulation model based on measured inductance and resistance of the transmitter coil and receiver coil and comprising a characteristic curve as a function of the plurality of currents applied to the transmitter coil; and detect a foreign object by detecting a power loss from the transmitter coil to the receiver coil based on the simulation model.

The circuitry of the system shown in FIGS. 3 and 18, in some aspects, may be used to implement various functions, operations, acts, processes, and/or methods disclosed herein. The processors 318 and 1808 may be operably coupled to one or more data storage devices (sometimes referred to herein as "memory storing instructions 1810"). The memory storing instructions 1810 includes machine executable code stored thereon and the processor 1808 includes logic circuitry. The processor 318 of FIG. 3 may also comprise memory with machine executable code. The machine executable code includes information describing functional elements that may be implemented by (e.g., performed by) the logic circuitry. The logic circuitry is adapted to implement (e.g., perform) the functional elements described by the machine executable code.

When implemented by logic circuitry of the processor 1808 or the processor 318, the machine executable code adapts the processor 1808 to perform operations of aspects disclosed herein. For example, the machine executable code may adapt the processor 1808 to perform at least a portion or a totality of the command context of FIG. 17. As another example, the machine executable code may adapt the processor 1808 to perform at least a portion or a totality of the operations discussed for the processor 318 of FIG. 3. As a specific, non-limiting example, the machine executable code may adapt the processor 1808 or the processor 318 to perform at least a portion of method of the of FIG. 17.

The processors 318 and 1808 may include a general purpose processor, a specific purpose processor, a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a specific-purpose computer while the general-purpose computer is configured to execute functional elements corresponding to the machine executable code (e.g., software code, firmware code, hardware descriptions) related to aspects of the present disclosure. It is noted that a general-purpose processor (may also be referred to herein as a host processor or simply a host) may be a microprocessor, but in the alternative, the processors 318 and 1808 may include any conventional processor, controller, microcontroller, or state machine. The processors 318 and 1808 may also be implemented as a combination of computing devices, such as a combination of a DSP and a microprocessor, a plurality of microprocessors, one or more microprocessors in conjunction with a DSP core, or any other such configuration.

In some aspects, the memory 1810 includes volatile data storage (e.g., random-access memory (RAM)), non-volatile data storage (e.g., Flash memory, a hard disc drive, a solid state drive, erasable programmable read-only memory (EPROM), without limitation). In some aspects, the processors 318 and 1808 and the memory 1810 may be implemented into a single device (e.g., a semiconductor device product, a system on chip (SOC), without limitation), In some aspects, the processors 318 and 1808 and the memory 1810 may be implemented into separate devices.

In some aspects, the machine executable code may include computer-readable instructions (e.g., software code, firmware code). By way of non-limiting example, the computer-readable instructions may be stored by the memory 1810, accessed directly by the processors 318 and 1808, and executed by the processors 318 and 1808 using at least the logic circuitry. Also, by way of non-limiting example, the computer-readable instructions may be stored on the memory 1810, transferred to a memory device (not shown) for execution, and executed by the processors 318 and 1808 using at least the logic circuitry. Accordingly, in some aspects, the logic circuitry includes electrically configurable logic circuitry.

Regardless of whether the machine executable code includes computer-readable instructions or a hardware description, the logic circuitry is adapted to perform the functional elements described by the machine executable code when implementing the functional elements of the machine executable code. It is noted that although a hardware description may not directly describe functional elements, a hardware description indirectly describes functional elements that the hardware elements described by the hardware description are capable of performing.

Although examples have been described above, other variations and examples may be made from this disclosure without departing from the spirit and scope of these disclosed examples.

The invention claimed is:

1. A method comprising:
   providing a transmitter coil;
   measuring inductance and resistance of the transmitter coil in standalone conditions using a meter circuit when a plurality of currents are applied to the transmitter coil;
   providing a receiver coil mated to the transmitter coil without a foreign object present;
   measuring inductance and resistance of the transmitter coil and receiver coil in mated conditions using the LCR meter circuit when the plurality of currents are applied to the transmitter coil;
   generating a simulation model based on measured inductance and resistance of the transmitter coil and receiver coil and comprising a characteristic curve as a function of the plurality of currents applied to the transmitter coil;
   providing a receiver coil mated to the transmitter coil with a foreign object present; and
   detecting the foreign object by detecting a power loss from the transmitter coil to the receiver coil based on the simulation model.

2. The method as in claim 1, wherein measuring inductance and resistance of the transmitter coil and receiver coil in mated conditions using the LCR meter circuit when the plurality of currents are applied to the transmitter coil comprises measuring inductance and resistance on a transmitter side of the mated coils.

3. The method as in claim 1, wherein measuring inductance and resistance of the transmitter coil and receiver coil in mated conditions using the LCR meter circuit when the plurality of currents are applied to the transmitter coil comprises measuring inductance and resistance on a receiver side of the mated coils.

4. The method as in claim 1, wherein measuring inductance and resistance of the transmitter coil and receiver coil in mated conditions using the LCR meter circuit when the plurality of currents are applied to the transmitter coil comprises measuring inductance and resistance with terminals of the transmitter coil short circuited with the terminals of the receiver coil so the coils are in series in a forward direction.

5. The method as in claim 1, wherein measuring inductance and resistance of the transmitter coil and receiver coil in mated conditions using the LCR meter circuit when the plurality of currents are applied to the transmitter coil comprises measuring inductance and resistance with terminals of the transmitter coil short circuited with alternate terminals of the receiver coil so the coils are in series in a reverse direction.

6. The method as in claim 1, wherein the simulation model comprises:
   a voltage source;
   a transmitter coil circuit comprising a transmitter capacitor in series with a transmitter resistor in series with a transmitter inductor;
   a receiver coil circuit comprising a receiver capacitor in series with a receiver resistor in series with a receiver inductor;
   a middle circuit comprising a middle resistor and a middle inductor; and
   an output circuit comprising an output capacitor in parallel with an output load resistor;
   wherein the voltage source is in series with the transmitter coil circuit and a combination of the middle circuit, the receiver coil circuit, and the output circuit,
   wherein the middle circuit is in parallel with a combination of the receiver coil circuit and the output circuit.

7. The method as in claim 6,
   wherein measuring inductance and resistance of the transmitter coil and receiver coil in mated conditions using the LCR meter circuit when the plurality of currents are applied to the transmitter coil comprises measuring inductance (Ltr2) and resistance (Rtr2) on a transmitter side of the mated coils;
   wherein measuring inductance and resistance of the transmitter coil and receiver coil in mated conditions using the LCR meter circuit when the plurality of currents are applied to the transmitter coil comprises measuring inductance (Ltr3) and resistance (Rtr3) on a receiver side of the mated coils;
   wherein measuring inductance and resistance of the transmitter coil and receiver coil in mated conditions using the LCR meter circuit when the plurality of currents are applied to the transmitter coil comprises measuring inductance (Ltr4) and resistance (Rtr4) with terminals of the transmitter coil short circuited with the terminals of the receiver coil so the coils are in series in a forward direction;
   wherein measuring inductance and resistance of the transmitter coil and receiver coil in mated conditions using the LCR meter circuit when the plurality of currents are applied to the transmitter coil comprises measuring inductance (Ltr5) and resistance (Rtr5) with terminals of the transmitter coil short circuited with alternate terminals of the receiver coil so the coils are in series in a reverse direction;

comprising assigning values to features of the simulation model derived from the measured inductance and resistance as follows:

inductance of the middle inductor $$(Lm) = \left| \frac{(Ltr4 - Ltr5)}{4} \right|;$$

resistance of the middle resistor $$(Rm) = \left| \frac{(Rtr4 - Rtr5)}{4} \right|;$$

inductance of the transmit inductor=Ltr2−Lm;
resistance of the transmit resistor=Rtr2−Rm;
inductance of the receive inductor=Ltr3−Lm; and
resistance of the receive resistor=Rtr3−Rm.

8. The method as in claim 7, comprising:
assigning a resistance value to the output load resistor corresponding to a load powered by the receiver coil;
changing the output load resistor of the output circuit based on a root mean square power level across the output circuit;
measuring a current flowing through respective ones of the transmitter resistor, the receiver resistor, and the middle resistor; and
computing a root mean square of respective ones of the transmitter resistor, the receiver resistor, and the middle resistor.

9. The method as in claim 1, comprising: calibrating the simulation model in view of the transmitter coil without a receiver coil, magnets, or foreign objects in a vicinity of the transmitter coil.

10. The method as in claim 1, wherein detecting a power loss from the transmitter coil to the receiver coil comprises:
determining a total power consumed at a given instant;
computing a power loss in the transmitter coil by feeding the coil current at a given instant into the characteristic curve of the simulation model;
subtracting a power loss in the transmitter coil from the total power consumed to determine a power transmitted from the transmitter coil to the receiver coil;
measuring the power received by the receiver coil; and
subtracting the power transmitted from the transmitter coil to the receiver coil from the power received by the receiver coil.

11. The method as in claim 1, comprising comparing a power loss in the transmitter coil to the receiver coil to a predetermined threshold power loss value.

12. A system comprising:
a transmitter coil;
a receiver coil;
the LCR meter circuit;
a processor;
memory storing instructions that, when executed by the processor, cause the system to:
measure inductance and resistance of the transmitter coil in standalone conditions with the LCR meter circuit when a plurality of currents are applied to the transmitter coil;
measure inductance and resistance of the transmitter coil and receiver coil in mated conditions with the LCR meter circuit when the plurality of currents are applied to the transmitter coil;
generate a simulation model based on measured inductance and resistance of the transmitter coil and receiver coil and comprising a characteristic curve as a function of the plurality of currents applied to the transmitter coil; and
detect a foreign object by detecting a power loss from the transmitter coil to the receiver coil based on the simulation model.

13. The system as in claim 12, wherein instructions that, when executed by the processor, cause the system to measure inductance and resistance on a transmitter side of the mated coils.

14. The system as in claim 12, wherein instructions that, when executed by the processor, cause the system to measure inductance and resistance on a receiver side of the mated coils.

15. The system as in claim 12, wherein instructions that, when executed by the processor, cause the system to measure inductance and resistance with terminals of the transmitter coil short circuited with the terminals of the receiver coil so the coils are in series in a forward direction.

16. The system as in claim 12, wherein instructions that, when executed by the processor, cause the system to measure inductance and resistance with terminals of the transmitter coil short circuited with alternate terminals of the receiver coil so the coils are in series in a reverse direction.

17. The system as in claim 12, wherein the simulation model comprises:
a voltage source;
a transmitter coil circuit comprising a transmitter capacitor in series with a transmitter resistor in series with a transmitter inductor;
a receiver coil circuit comprising a receiver capacitor in series with a receiver resistor in series with a receiver inductor;
a middle circuit comprising a middle resistor and a middle inductor; and
an output circuit comprising an output capacitor in parallel with an output load resistor;
wherein the voltage source is in series with the transmitter coil circuit and a combination of the middle circuit, the receiver coil circuit, and the output circuit,
wherein the middle circuit is in parallel with a combination of the receiver coil circuit and the output circuit.

18. The system as in claim 17,
wherein instructions that, when executed by the processor, cause the system to measure inductance (Ltr2) and resistance (Rtr2) on a transmitter side of the mated coils;
wherein instructions that, when executed by the processor, cause the system to measure inductance (Ltr3) and resistance (Rtr3) on a receiver side of the mated coils;
wherein instructions that, when executed by the processor, cause the system to measure inductance (Ltr4) and resistance (Rtr4) with terminals of the transmitter coil short circuited with the terminals of the receiver coil so the coils are in series in a forward direction;
wherein instructions that, when executed by the processor, cause the system to measure inductance (Ltr5) and resistance (Rtr5) with terminals of the transmitter coil short circuited with alternate terminals of the receiver coil so the coils are in series in a reverse direction;

wherein instructions that, when executed by the processor, cause the system to assign values to features of the simulation model derived from the measured inductance and resistance as follows:

inductance of the middle inductor $$(Lm) = \left|\frac{(Ltr4 - Ltr5)}{4}\right|;$$

resistance of the middle resistor $$(Rm) = \left|\frac{(Rtr4 - Rtr5)}{4}\right|;$$

inductance of the transmit inductor=Ltr2−Lm;
resistance of the transmit resistor=Rtr2−Rm;
inductance of the receive inductor=Ltr3−Lm; and
resistance of the receive resistor=Rtr3−Rm.

19. The system as in claim 17, comprising:
wherein instructions that, when executed by the processor, cause the system to assign a resistance value to an output load resistor corresponding to a load powered by the receiver coil;
wherein instructions that, when executed by the processor, cause the system to change the output load resistor of the output circuit based on a root mean square power level across the output circuit;
wherein instructions that, when executed by the processor, cause the system to measure a current flowing through respective ones of the transmitter resistor, the receiver resistor, and the middle resistor; and
wherein instructions that, when executed by the processor, cause the system to compute a root mean square of respective ones of the transmitter resistor, the receiver resistor, and the middle resistor.

20. The system as in claim 17, wherein instructions that, when executed by the processor, cause the system to:
determine a total power consumed at a given instant;
compute a power loss in the transmitter coil by feeding the coil current at a given instant into the characteristic curve of the simulation model;
subtract the power loss in the transmitter coil from the total power consumed to determine a power transmitted from the transmitter coil to the receiver coil;
measure the power received by the receiver coil; and
subtract the power transmitted from the transmitter coil to the receiver coil from the power received by the receiver coil.

* * * * *